J. G. MILLER.
CLEVISES.

No. 170,758.  Patented Dec. 7, 1875.

WITNESSES:
E. Wolff
Alex T. Roberts

INVENTOR:
J. G. Miller
BY Munn &Co
ATTORNEYS.

UNITED STATES PATENT OFFICE.

JOHN G. MILLER, OF FREDERICKSBURG, VIRGINIA.

IMPROVEMENT IN CLEVISES.

Specification forming part of Letters Patent No. 170,758, dated December 7, 1875; application filed October 29, 1875.

*To all whom it may concern:*

Figure 1:
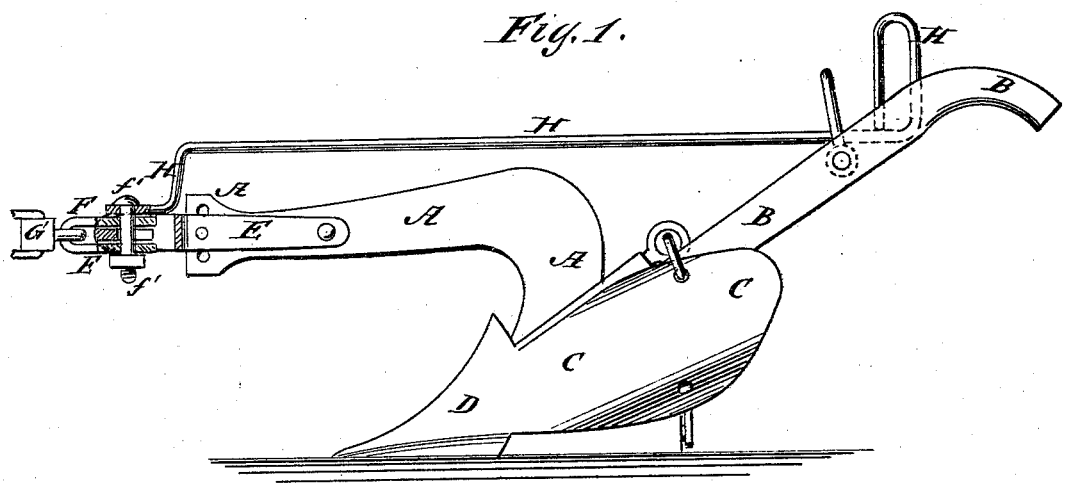
Figure 2:
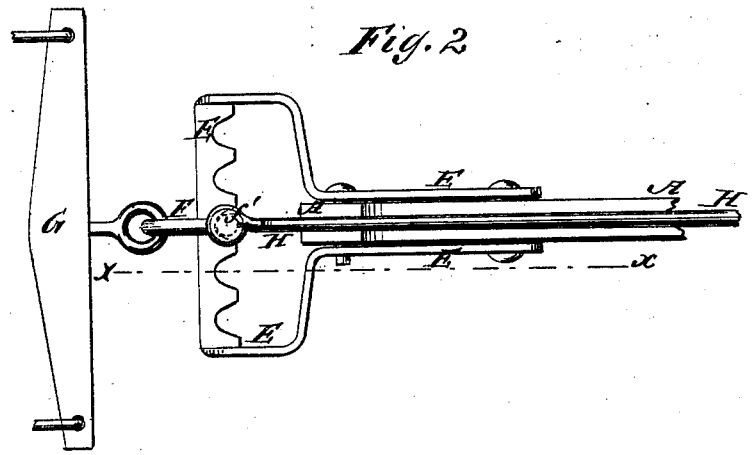

Be it known that I, JOHN G. MILLER, of Fredericksburg, in the county of Spottsylvania and State of Virginia, have invented a new and useful Improvement in Plow-Clevis Adjuster, of which the following is a specification:

Figure 1 is a side view of my improved clevis-adjuster, shown as applied to a reversible or side-hill plow, and partly in section through the line $x$ $x$, Fig. 2. Fig. 2 is a top view of the same.

Similar letters of reference indicate corresponding parts.

The object of this invention is to furnish an improved device for adjusting the clevis of a plow, and especially of a reversible or side-hill plow, to cause the said plow to take more or less land, and which shall be simple in construction and convenient in use.

The invention consists in the combination of the adjustable notched clevis, the adjustable double-tree clevis, and the rod with each other, and with the beam and handle of a plow, as hereinafter fully described.

A represents the beam, B the handles, C the mold-board, and D the point, of a reversible or side-hill plow, about the construction of which there is nothing new. To the sides of the forward end of the plow-beam A is secured the clevis E by two bolts, the forward end of the plow-beam A having several holes formed in it to receive the forward bolt, so that the point of draft attachment may be raised and lowered to adjust the plow to run deeper or shallower in the ground, as may be desired. The cross-bar of the clevis E is made long, and has a number of notches formed in it, as shown in Fig. 2. F is the double-tree clevis, which is passed through the staple of the double-tree G, and its bolt $f'$ is passed through the clevis E, so as to rest in one of the notches of the said clevis. To the bolt $f'$ of the clevis F is attached the forward end of the rod H, that passes back above the plow beam A, passes through a guide-loop formed upon or attached to the round of the plow-handles B, and has a handle formed upon its rear end.

By this construction the plowman, when he turns the team and reverses the plow, can, by means of the rod H, shift the clevis F from one to another of the notches of the clevis E, to cause the plow to take more or less land, as may be desired.

Having thus described my invention, I claim as new and desire to secure by Letters Patent—

The combination of the adjustable notched clevis E, the adjustable double-tree clevis F, and the rod H with each other, and with the beam and handles of a plow, substantially as herein shown and described.

JOHN G. MILLER.

Witnesses:
HENRY MILLHOUSER,
F. THEO. MILLER.